UNITED STATES PATENT OFFICE.

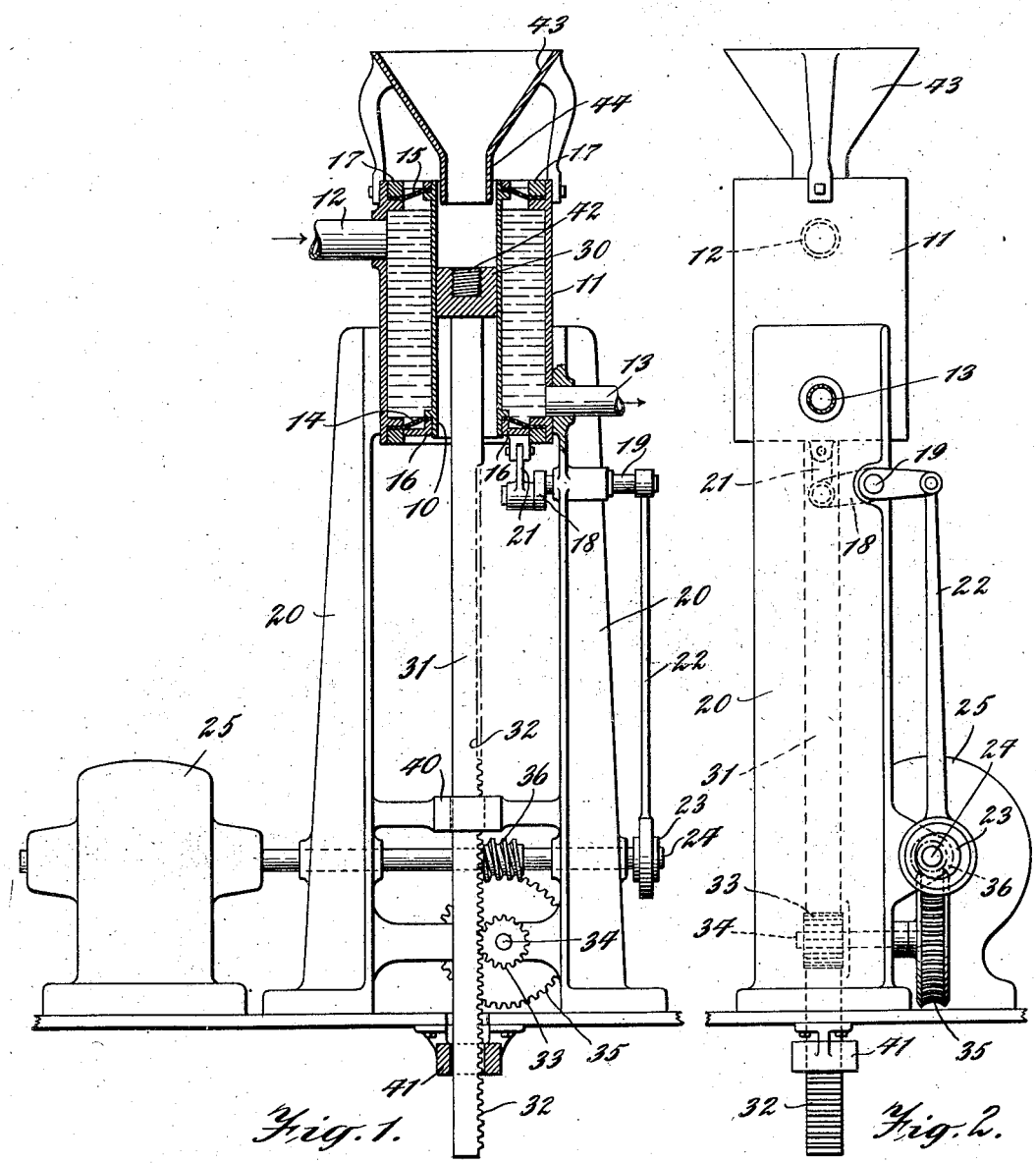

CORNELIUS W. VAN RANST, OF NEW ROCHELLE, NEW YORK.

APPARATUS AND METHOD FOR CASTING.

1,385,595.     Specification of Letters Patent.     Patented July 26, 1921.

Application filed August 26, 1919. Serial No. 320,010.

*To all whom it may concern:*

Be it known that I, CORNELIUS W. VAN RANST, a citizen of the United States, residing at 19 Manhattan avenue, New Rochelle, in the county of Westchester, State of New York, have invented certain new and useful Improvements in Apparatus and Methods for Casting, of which the following is a specification.

This invention relates to method and apparatus for the casting of bars or the like continuously and particularly one in which a solid mold of relatively short length may be used for the production of bars of any desired length.

With these and other objects in view my invention consists of certain novel methods and features of construction as will be more fully described and pointed out in the appended claims.

In the drawings Figure 1 represents a partial sectional elevation of a novel form of apparatus adapted to carry out my novel process, and Fig. 2 is a side elevation of the same.

The corresponding parts are referred to in both the drawings and the specification by similar reference characters.

In the drawings 10 represents an illustrative form of mold held centrally in a cooling chamber 11, this chamber being provided with the pipes 12 and 13 by which a water circulation therethrough may be maintained. For reasons to be pointed out hereinafter the mold 10, in the form of my invention illustrated, is made to vibrate vertically and in order to permit this motion without interfering with the water jacketing I preferably provide a pair of flexible diaphragms 14, 15 connected to the mold 10 and to the cylinder 11 by suitable plates 16, 17 so as to make a water-tight joint. As a means for supporting and moving the mold 10 I provide any suitable mechanism, and as illustrative of one form of such device I have shown a lever 18 pivoted at 19 on the machine frame 20, and connected by a pitman 21 to the bottom of the plate 16 which supports the mold 10. Vibratory motion is given to the pitman 21 by a rod 22 operated by an eccentric 23 on a driving shaft 24 connected with any suitable source of power as a motor 25, the shaft 24 being mounted in suitable bearings in the machine frame 20.

Vertically movable within the mold 10 is a mold bottom or plunger 30 connected to a rod 31 provided with rack teeth 32 engaging the teeth of a pinion 33 on a shaft 34 mounted in bearings in the frames 20. The shaft 34 is actuated by a gear 35 driven by a worm 36 on the shaft 24. The rod 31 moves in bearings 40, 41 connected to the machine frames, and the plunger 30 is provided with a threaded opening 42 for a purpose to be hereinafter described.

Supported on the cylinder 11 is a funnel 43 having a neck 44 which is smaller than the opening in the mold 10.

In producing certain forms of castings, it is desirable that such castings be made in long bars of any desired shape in cross section and I produce such cast bars by means of the apparatus just described, in the following manner. With the parts in the position shown in the drawings, the motor 25 is started in operation which not only vibrates the mold 10 up and down rapidly through a short distance, but also slowly draws the rod 31 and the plunger 30 downward. The water circulation is turned on. The molten metal, which preferably is one of the softer kinds as lead, zinc, brass, or any of the alloys thereof, is then poured into the funnel 43. The first metal fills the opening 42 and hardens in the threads thereof, and the molten metal is poured into the mold 10 only as fast as the plunger 30 is being moved downward. The metal is cooled by the water circulation through the pipes 12 and 13 so that by the time the plunger 30 has reached the bottom of the mold and passes out therefrom, the metal directly above it has been hardened into a solid rod. The pouring may be continued as long as desired and until the plunger 30 has reached the end of its stroke, which, of course, may be made of any desired length when the machine is constructed.

The constant vibration of the mold 10 prevents the metal from "freezing" to that mold as it is being hardened, and consequently there exists at all times during the process a solid rod, the upper end of which within the mold 10 becomes softer and softer as the top of the mold is approached, but with no part of the metal, either cold or molten, adhering to the mold 10.

It will be understood that my novel method comprises in essence the relative movement of the mold and the material being cast so that adherence between the two is prevented, and this relative movement may be obtained in many different ways without departing from the spirit of my invention. Such relative motion may be obtained by a rotation of the mold where circular bars are being cast, and such rotation might be either continuous or oscillatory. I prefer the form of vibration which I have shown, however, because such motion is adapted for any cross sectional bar.

While I prefer to provide the plunger 30 with some form of device by which the bar being cast will be attached to the plunger and thus be subjected to a pull as the plunger is lowered, such attachment is not essential. Any other form of removable attachment may be used instead of the threaded opening 42.

It will also be understood that my novel method may be carried out by many forms of apparatus and that the device shown is merely illustrative of my preferred form.

I claim:

1. The method of casting bars which consists in pouring molten metal into one end of a short mold having an opening of substantially uniform cross section, cooling the metal in the mold, withdrawing the cooled metal from the opposite end of the mold while continuing to pour molten metal into the opposite end of the mold and reciprocating the mold relatively rapidly longitudinally of its length while the pouring and removal is continued.

2. A mold having an opening of substantially uniform cross section, a plunger movably mounted in said opening, means to move said plunger lengthwise of the opening and means to move the mold relatively to said plunger and longitudinally of said opening.

3. A mold having an opening of substantially uniform cross section, a plunger movably mounted in said opening, means to move said plunger lengthwise of the opening and means to reciprocate the mold longitudinally of said opening.

4. A mold having an opening of substantially uniform cross section, a plunger movably mounted in said opening, means to draw said plunger slowly longitudinally of said opening, and means to reciprocate said mold rapidly relatively to said plunger.

CORNELIUS W. VAN RANST.